United States Patent [19]

Louie et al.

[11] 3,877,489

[45] Apr. 15, 1975

[54] SPEED LIMITING VALVE

[75] Inventors: Albert Louie, San Leandro; Willard D. Childs, Moraga; A. Bruce Duncan, Piedmont, all of Calif.

[73] Assignee: The Rucker Company, Oakland, Calif.

[22] Filed: Sept. 4, 1973

[21] Appl. No.: 394,380

[52] U.S. Cl. .................. 138/46; 137/513.3; 251/16
[51] Int. Cl. ............................................. F15d 1/00
[58] Field of Search ........... 138/46; 137/513.3, 538; 73/502; 251/16

[56] References Cited
UNITED STATES PATENTS

| | | | |
|---|---|---|---|
| 783,679 | 2/1905 | Caille | 73/502 |
| 1,758,080 | 5/1930 | Klemm, Jr. | 138/46 X |
| 2,353,161 | 7/1944 | Heigis | 137/513.3 X |
| 2,543,455 | 2/1951 | Goepfrich | 138/46 |
| 2,664,106 | 12/1953 | Livers | 251/16 |
| 3,184,211 | 5/1965 | Chapman et al. | 137/513.3 X |

Primary Examiner—Richard C. Queisser
Assistant Examiner—Daniel M. Yasich
Attorney, Agent, or Firm—Lothrop & West

[57] ABSTRACT

A speed limiting valve for use in hydraulic equipment particularly in a hydraulic line between flanges therein includes a valve plate having an opening therethrough for bi-directional line flow. There is a cage on and upstanding from the other side of the plate surrounding the opening. A stationary valve stem is mounted on the cage and extends through the opening and serves as a guide for a slidably mounted valve disk movable between one position in abutment with the valve seat and another position spaced away from the valve seat. A spring surrounds the stem and abuts against part of the cage and against the valve disk and urges the valve disk toward the other position against a stop on the stem. In the other position the disk is disposed in a chamber having diverging and converging walls. The valve disk has flow passages through it so that even when the disk is seated there is still an opportunity for reduced hydraulic flow.

4 Claims, 2 Drawing Figures

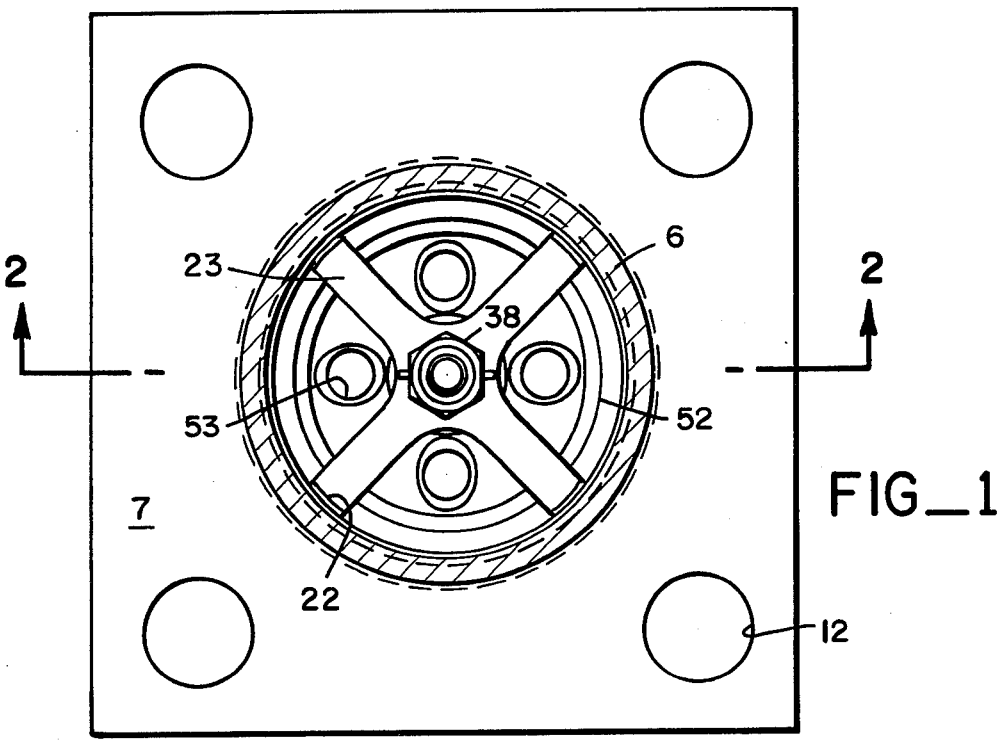
FIG_1
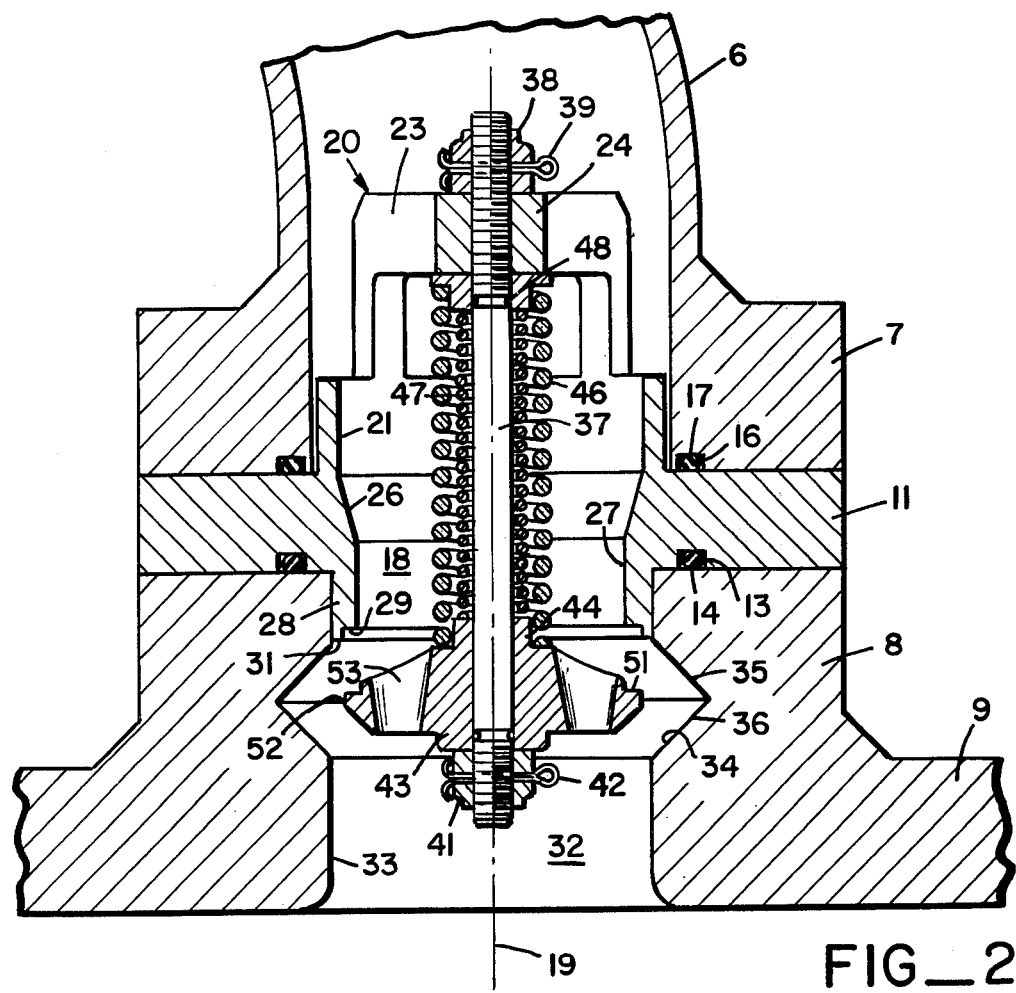
FIG_2

SPEED LIMITING VALVE

In many pieces of hydraulic equipment there is a normal hydraulic flow which is designed for and is acceptable since it is well within the strength or other operating characteristics of the mechanism. Occasionally, however, a design must contemplate that a failure in some other part of the mechanism might occur suddenly and might then impose excessive strains on the machinery. There is a requirement, consequently, for some device which will in an emergency limit or restrict the amount of possible hydraulic flow to a value or values which are safe yet which will not interfere with the normal or usual or designed operation of the structure.

It is therefore an object of the invention to provide a speed limiting valve which can be readily incorporated in a hydraulic line and which stands ready to limit the amount of flow in the line under emergency conditions without substantially or importantly restricting the flow under proper conditions.

Another object of the invention is to provide a speed limiting valve which is a separate entity so that it can be included or omitted from relatively standard hydraulic lines.

Another object of the invention is to provide a speed limiting valve which can be set or adjusted to respond differently to different conditions.

A further object of the invention is to provide a speed limiting valve that can easily and readily and economically be manufactured, utilized and serviced.

A further object of the invention is in general to provide an improved speed limiting hydraulic valve.

Other objects, together with the foregoing, are attained in the embodiment of the invention described in the accompanying description and illustrated in the accompanying drawing, in which:

FIG. 1 is a plan of a speed limiting valve constructed pursuant to the invention; and FIG. 2 is a cross-section through the valve of FIG. 1, the plane of section being indicated by the lines 2—2 of FIG. 1.

Although the speed limiting valve pursuant to the invention can be incorporated in many different environments, it has with success been incorporated with certain hydraulic mechanisms such as drill string compensators as shown in U.S. Pat. No. 3,804,183 issued on Apr. 16, 1974 on an application filed May 1, 1972, and such as with tensioners utilized in connection with flexible wire rope under tension and subject to abrupt failure, as shown in U.S. Pat. No. 3,314,657, issued on Apr. 18, 1967. The usual mechanism includes a hydraulic line 6 having an end flange 7 and likewise includes an end flange 8 which is incorporated with a hydraulically useful body 9 of generally standard external configuration and designed to be united with the flange 7 by customary fastening devices, not shown. The body 9 can be spaced away from the line 6 a sufficient distance to accommodate the present speed limiting valve.

Under such circumstances there is provided a valve plate 11, generally of the same cross-sectional contour as the flange 7 or the flange 8, for example, and interposed therebetween. The valve plate 11 has a number of fastening apertures 12 therein to receive bolts which likewise pass through the flange 7 and conveniently enter into the flange 8. The plate 11 is designed for leakproof mounting and hence has a peripheral groove 13 for the reception of an O ring 14 seated against the face of the flange 8. The flange 7 is preferably provided with a groove 16 receiving an O ring 17 to be interposed between and preventing leakage along the interface between the flange 7 and the plate 11.

The valve plate 11 has a passageway 18 therethrough generally concentric with a central axis 19 and is variously defined. The passage 18 is in part defined by the interior surfaces of a cage 20 forming part of and upstanding from one side of the plate 11. One part of the cage includes an annular collar 21 from which extend a plurality of legs 22, four in number in the present instance, the legs having radial arms 23 merging with a central boss 24 concentric with the axis 19. The cage thus defines a multiple entry to the passageway 18 from the pipe 6.

The passage 18 is also defined by a convergent section 26 merging with a smaller cylindrical section 27 forming the interior boundary of a valve seat 28 on and upstanding from the valve plate 11 on the side opposite the cage 20. The valve seat 28 on the interior portion of its end is contoured to afford a flat seat 29 as well as an annular rim 31, both carefully and closely machined to be respectively normal to and concentric with the axis 19.

It is preferably provided that the body 9 has a special interior configuration in order to cooperate with the valve plate 11 in defining the passageway 18. To that end the passageway 18 merges with a passage 32 specially formed within the body 9. This passage has a generally cylindrical portion 33 concentric with the axis 19 and comparable in diameter to the cylindrical section 27. In a location between the portion 33 and the seat 28 there is a chamber 34 defined by a diverging conical surface 35 and a converging conical surface 36.

Pursuant to the invention there is mounted in the boss 24 by means of appropriately threaded connections an axially extending stem 37 designed to be adjusted axially with respect to the seat and held in adjusted position by a lock nut 38 secured by a keeper 30. The stem extends entirely through the passage 18 and in effect depends therefrom to project into the passage 32. The unsupported end of the stem is threaded and receives a positioning means in the form of a nut 41 also having a keeper 42 to hold the nut in position.

Slidably mounted on the stem 37 is a valve disk 43 having a hub 44 on one side to receive and center the adjacent ends of a pair of helical springs 46 and 47. At their other ends the springs abut an adaptor 48 also serving to center the springs. While the springs are arranged to have a relatively closely predetermined deflection characteristic, they nevertheless can be precisely set by adjusting the nuts 38 and 41 when the keepers are removed. The precise force required of the springs is readily available.

The valve disk 43 is specially configured. The disk has a flat rim 51 terminated by a cylindrical boundary 52. The rim 51 is designed to abut precisely against the seat 29 and the boundary 52 closely to engage the end rim 31 when the valve disk 43 is in a closed or "first" position. Importantly, the valve disk has therethrough one or more conically configured flow passages 53 arranged to diverge in the direction of the cage 20.

In the operation of this device the valve is normally held off its seat and in an open or second position as shown in FIG. 2 by the springs 46 and 47. Moderate or normal flow in either direction can occur through the pipe 6 and the passages 18, 32, 34 and 53 without any substantial interference by the valve. However, should there be a sudden flow from the passage 32 toward the passage 18; for example, due to a cable breakage and corresponding sudden drop in pressure in the pipe 6, then the resistance of the valve disk in the flow path is sufficient so that the pressure drop across the valve disk is sufficient to deflect the valve disk upwardly and compress the springs 46 and 47. If the differential force is large enough the valve disk is firmly seated against a maximum compression of the springs 46 and 47. The flow through the passages 32 and 18 is thus quickly reduced to an extent established by the areas and flow characteristics of the several passages 53 through the valve disk. This is a major throttling action and serves as a limit to the hydraulic flow through the connection. When and if the disability is removed and normal flow resumes then the disk is restored to its position, as shown in FIG. 2, by relaxation of the springs 46 and 47. The disk is properly stopped by the adjustable nut 41 with the disk in a fully open or second position substantially centered in the divergent-convergent chamber 34. That is, the open or "second" position of the valve disk 43 is set, or established or determined by abutment of the disk against the nut 41. Stated differently, the nut 41 serves as a means for determining the fully open or second position of the valve disk 43. Flow around the open disk is thus virtually unimpeded yet there is prompt and abrupt throttling of a set amount upon valve closure.

What is claimed is:

1. A surge flow speed limiting valve for use in hydraulic equipment comprising a hydraulic line having a valve plate, the valve plate being formed with an opening therethrough for allowing bi-directional line flow, means forming cage means on and projecting from one side of said plate surrounding said opening, means forming a valve seat on the other side of said plate surrounding said opening, a stationary valve stem mounted on said cage means and extending through said opening, a valve disk having at least one opening slidably mounted on said stem and movable thereon between a first position in abutment with said seat and a second position spaced away from said seat, spring means surrounding said stem and abutting said cage means and said valve disk resiliently pressing the valve disk toward said second position, means for stopping said valve disk in said second position, and means forming flow passages through said valve disk for allowing flow through the opening in the valve disk when in said second position.

2. A speed limiting valve as in claim 1 including a body in said hydraulic line abutting said valve plate and surrounding said valve seat, and means in said body defining a chamber in communication with said opening and having diverging and converging walls encompassing said valve disk in said second position.

3. A speed limiting valve as in claim 1 in which said means for determining said second position includes an adjustable interengagement between said valve stem and said valve cage means.

4. A speed limiting valve as in claim 1 in which said flow passages through said valve disk are divergent in the direction of said valve cage means.

* * * * *